Figure 3:
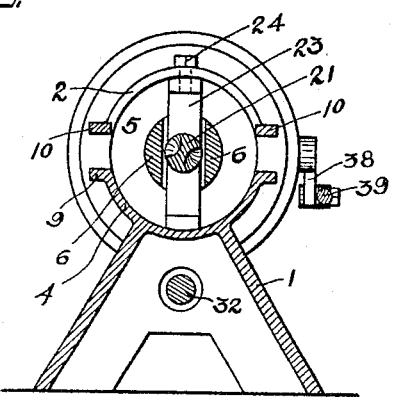

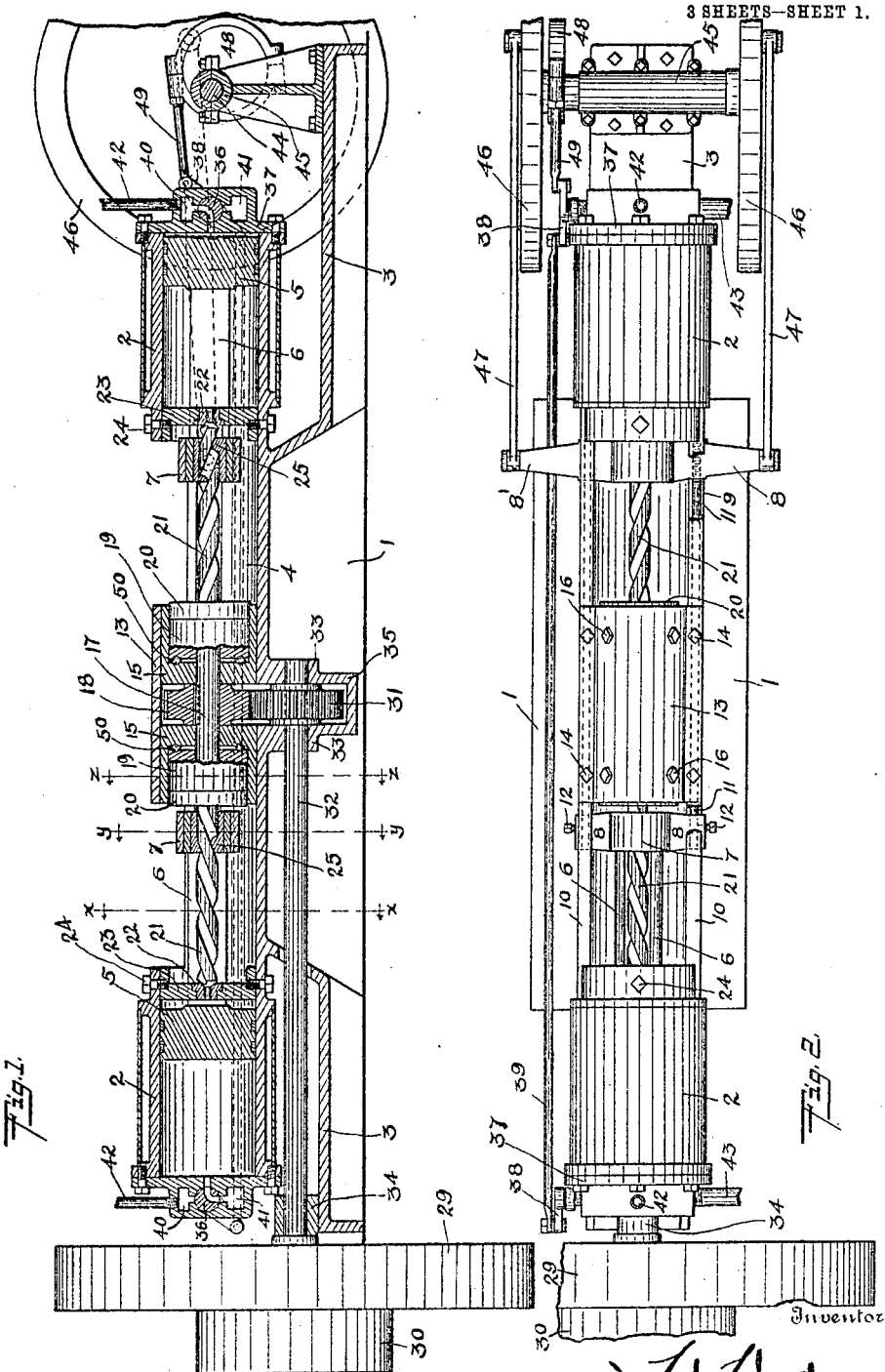

J. W. WEST.
FLUID PRESSURE ENGINE.
APPLICATION FILED AUG. 7, 1907.

944,064.

Patented Dec. 21, 1909.
3 SHEETS—SHEET 2.

Witnesses
Norvin Perup
Samuel L. Alpert.

Inventor
J. W. West
By Duell, Warfield & Duell
Attorney

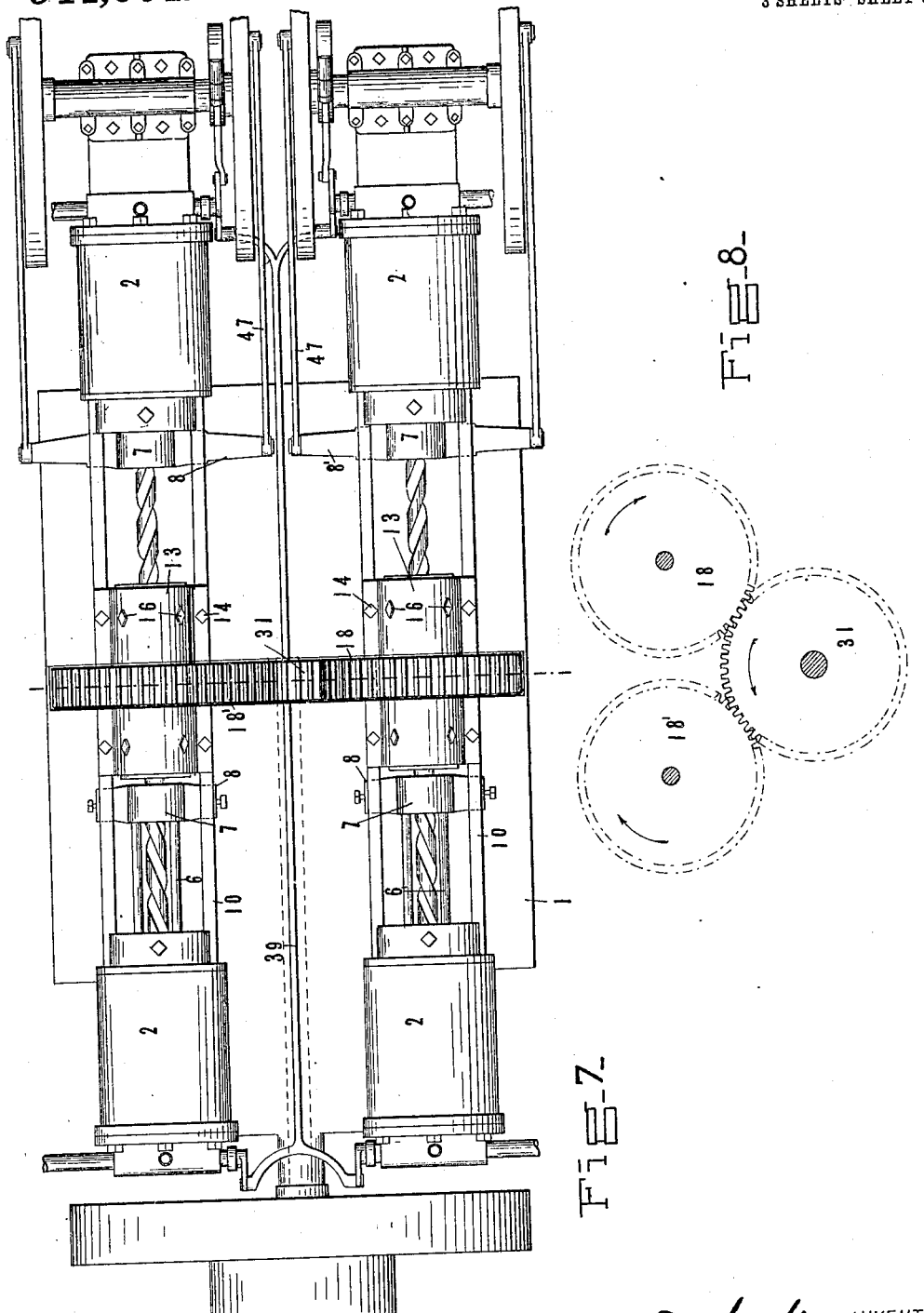

UNITED STATES PATENT OFFICE.

JOEL W. WEST, OF OMAHA, NEBRASKA.

FLUID-PRESSURE ENGINE.

944,064.　　　　　Specification of Letters Patent.　　Patented Dec. 21, 1909.

Application filed August 7, 1907. Serial No. 387,454.

*To all whom it may concern:*

Be it known that I, JOEL W. WEST, residing at Omaha, in the county of Douglas and State of Nebraska, have invented certain new and useful Improvements in Fluid-Pressure Engines, of which the following is a full, clear, and exact description, such as will enable others skilled in the art to which it appertains to make and use the same.
This invention relates broadly to certain improvement in engines or prime motors, but more specifically it concerns mechanisms of this character in which the expansion of an elastic or compressible fluid is economically utilized in effecting an interchange and transformation in energy relatively to a moving mechanical element and the fluid. Inasmuch, however, as certain advantages characteristic of this invention prominently appear when it is utilized as a fluid pressure means, in which a reciprocatory rectilinear motion of a piston will be directly converted into a continuous rotary motion around an axis substantially parallel with the path of the piston, (in contradistinction from the well known connecting rod and crank mechanism, in which the motion of the reciprocating piston is converted into a rotary motion around an axis perpendicular to the direction of motion of the reciprocating parts), it will be conducive to clearness to disclose it through certain of its embodiments in such relation.

As tending to a better understanding of the novel mechanical means for utilizing and applying the peculiar principles underlying this invention, it may be preliminarily pointed out that to construct a simple compact fluid pressure engine, such that the consumption of fluid may agree fairly with the power given out without any great loss in efficiency, has been the goal for which those highly skilled in the various mechanical arts have long striven. These arts have already resulted in devices characterized by a good degree of efficiency, but unfortunately this desideratum has been usually attained only through a very considerable complexity of design. This is especially true in the case of devices dealing with expansible fluids comprising reciprocatory pistons where it is necessary to have the driven shaft arranged in substantial parallelism with the piston rod. This invention accordingly seeks to provide a means of the nature described, which, from an operative standpoint, will in practical usage possess a high degree of efficiency and durability and which, structurally considered, will be of the greatest possible simplicity and compactness and be composed of but few parts, all of which are capable of being manufactured at a minimum cost, and so correlated as to be capable of being very readily assembled by the ordinary skilled of the art to accomplish the purposes intended.

Other objects and advantages will be in part obvious from the annexed drawings and in part pointed out in the following description.

The invention accordingly consists in the features of construction, combination of elements, and arrangement of parts which will be exemplified by the embodiments hereinafter set forth and defined as to scope and applicability by the prior art after the manner indicated in the appended claims.

In order that this invention may be the more fully understood and may be comprehensible to others skilled in its relating arts, drawings illustrating several of the many possible applications of the same are annexed as a part of this specification, and while the controlling features of this invention may be otherwise applied by modifications falling within the intended scope of the claims, the hereindisclosed embodiments are those which will ordinarily be resorted to in practice and are regarded as representing substantial improvement over many of the seemingly obvious variations of the same.

In the appended drawings corresponding parts are similarly referred to by like character of reference throughout all the figures, of which—

Figure 4:
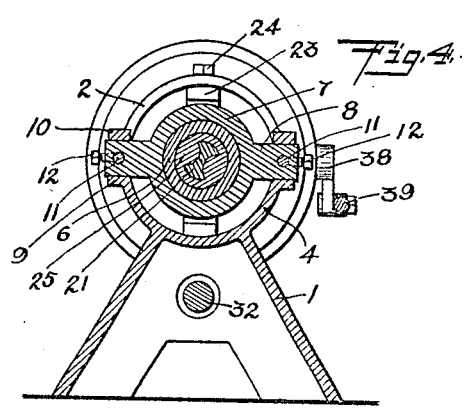

Figure 1 is a longitudinal sectional elevation showing one embodiment of my invention in which a pair of alined cylinders and pistons coöperate with an intermediate mechanism for the purpose of continuously rotating a driving shaft arranged in substantial parallelism with the piston rods. Fig. 2 is a top plan view of the mechanism of Fig. 1. Fig. 3 is a transverse vertical section taken along line *x*—*x* of Fig. 1 and showing the relation between the bifurcated piston-rod and the worm of the intermediate mechanism. Fig. 4 is a vertical transverse section taken along line *y*—*y* of Fig. 1 showing the bushing carried by the piston rod intermeshing with the said worm. Fig.

Figure 5:
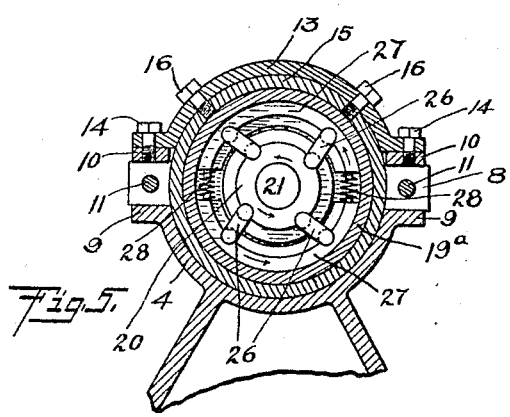
Figure 6:
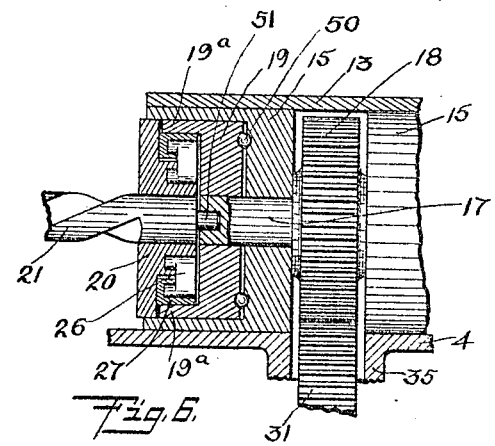

5 is a transverse vertical section taken along line z—z of Fig. 1 showing details of one of the clutches which acts to turn the driven member and short shaft. Fig. 6 is a longitudinal sectional elevation taken through the clutch and associated elements shown by Fig. 5 and setting forth the details of the same. Fig. 7 is a top plan view of a modification of my invention. Fig. 8 is a diagrammatical sectional view showing the relation of the gears.

Continuing now with such occasional reference to the drawings as may be requisite to clearly follow the detailed description of the same, 1 represents a suitable base or frame which may have integrally formed therewith, at each end thereof, the alined cylinders 2 which may, as shown, overhang the end portions 3 of the base. The portion of the base intervening between the alined cylinders may conveniently be utilized as a guide for the reciprocating parts and as a support for the intermediate motion transforming mechanism, and to that end it may provide a semi-circular trough portion whose radius may be the same as that of the bore of the cylinders. So also it may be fashioned to provide slides 9 and 10, shown more clearly by Figs. 3 and 4, which are designed to accommodate the reciprocating cross-heads carried by the piston rods. The pistons 5 are in relatively close inter-fitting relation within the cylinders and are provided with packing rings or other means for insuring a close fit in the usual manner. The piston rods 6, which are firmly connected to the pistons, protrude from the inner ends of the cylinders (which in this case are shown to be open) and extend a distance somewhat greater than the normal stroke or travel of the pistons in order to provide the requisite room for the play of the cross-heads 7, which are secured to the piston rods. These cross-heads, of which there is one corresponding to each piston, are firmly secured to the piston rods and provide laterally extending bearing arms 8 which have a sliding bearing on the guide-ways formed between the slides or flanges 9 and 10 above alluded to. To insure a synchronous movement of these two cross-heads, they are preferably connected with each other by means of rods 11 which are preferably in screw threaded engagement with one of the cross-heads and have an adjustable attachment to the other so that the distance between the said cross-heads may be easily adjusted. When determined, this distance may be fixed against variation by means of the set screws 12 as indicated more clearly by Figs. 2 and 4. Arranged above these cross-heads, I have provided a motion transforming mechanism. This comprises a pair of bearing blocks 15 which are firmly secured to the trough-shaped portion 4 of base 1. This mounting may be conveniently attained by providing a cover 13, which at its ends is secured to the guide bars 10 by means of screws 14. Within the rise of said cover, I have provided screws 16 which take into the underlying bearing blocks 15, as shown more clearly by Fig. 5 thereby securely retaining said bearing blocks in place. These bearing blocks, as will be perceived by referring to Fig. 1, are spaced apart and are centrally apertured to accommodate a short shaft 17, having fixed thereto an intermediate gear 18. This shaft is journaled in said bearing blocks and has fixed to each of its ends a driven member 19 forming a part of the clutches used in the hereindescribed embodiment. These driven members 19, as well as the driven members 20 of the clutches, are preferably inclosed or housed in counterbored portions of the bearing blocks, as shown more clearly by Fig. 6. The short shaft 17, together with the intermediate gear and the two outer driven members 19 all move as a unit and, to reduce friction and take up the end thrust, I may employ ball bearings shown by 50. These members 19 are rotated through the instrumentality of clutches, each composing a driving member 20 fixed to a revoluble worm shaft 21. The preferred mounting is illustrated more clearly by Fig. 6 in which the revoluble shaft 21 provides a journal portion 51 which has a bearing within the end of the short shaft 17. This arrangement serves to permit a free relative movement between the driving and driven members 20 and 19 respectively, save only when the clutch acts to lock the two together. This mounting always insures a perfectly central disposition of the driving member 20 with respect to the driven member 19 so as to enable the clutch to always act.

The driving members 20 of the clutches each carry on their inner faces a series of links 26 which are pivoted at their inner ends to the driving members and extend outwardly at an angle to the radii passing through their points of pivot. These links at their outer ends carry segmental clutch shoes 27, as more clearly appears from Figs. 5 and 6. The outer faces of the said clutch shoes 27 bear upon the inner annular surfaces of the overhanging flange portions 19$^a$ of the driven clutch members 19, and are resiliently maintained against such surfaces by small coil springs 28, which may be disposed in any suitable manner, as for example in the clearance space between the adjoining ends of the clutch shoes as shown. Owing to the tangential position of the links 26, the effect of a left-handed rotation of the driving member 20, i. e. in the direction indicated by arrows in Fig. 5, will be to urge the links into a more nearer radial direction and, as a consequence, the shoes 27 will be forced outwardly, causing them to wedge and frictionally engage with the flange portions of the members 19. As a result of this engagement between the shoes carried by the driving members 20 and the driven member 19, a right-handed rotation of the former will result in a like rotation of the latter. A reverse movement of the driving member, however, tends to withdraw the shoes 27, thus enabling the latter to freely slide around the inner annular surface of the driven member 19, which will therefore be unaffected by said movement of the driving member. The driving members, as has been already pointed out are each fixed to a corresponding worm or screw-shaft 21. These shafts are provided with screw like helical grooves, which are preferably approximately semi-circular in cross-section and, on the one shaft the groove or helix convolutes in a right-handed direction, whereas on the other it convolutes in a left-handed direction. The purpose of this is to enable the one shaft or worm, as it may be conveniently termed, to be rotated in a right-handed direction during a left-handed movement of one piston, and to enable the other worm to be moved in the opposite direction, that is to say, as the pistons reciprocate back and forth they will alternatively act upon the short shaft 17 to maintain the same in a continuous rotation in the same direction. To this end I have provided suitable connections between the piston rods and the two worms, which connections each comprise a bushing 25 of bearing metal which is in inter-fitting relation with the helical grooves of the screw shafts or worms. Thus, as the pistons reciprocate, the bushing will slide along the said worms and cause the same to alternately rotate back and forth, which rotations in turn act upon the short shaft 17. The piston rod connected with each piston is provided with a longitudinal slot and the bushing is mounted at the outer end of the piston so that the worm is enabled to be mounted at its free end on a suitable upright post 23, as shown more clearly by Figs. 1 and 3. The upright post 23 may be provided with a bearing 22 within which the free end of the worm is journaled and this post may also be fixed in position by means of screws 24. By virtue of this construction, it will be seen that the pistons as they reciprocate accomplish an alternative rotation of each worm, which contributes toward effecting a continuous rotation of the short shaft 17.

Mounted in the frame of the engine is a drive shaft 32 which is arranged in substantial parallelism with the piston rods. This drive shaft at its one end is journaled in the bearings 33 formed in the gear casing 35 and has keyed to it a gear 31 in mesh with the intermediate gear 18. At its other end the drive shaft is journaled in bearings 34 provided by the end portion 3 of the base and carries on its protruding end a fly-wheel 29 and a belt pulley 30. This shaft and the wheels carried thereby are thus given a continuous rotation by the reciprocations of the pistons.

Figs. 7 and 8 show two pairs of pistons operatively connected with the central drive shaft gear, each by means of gears 18 and 18′ after the manner illustrated in Fig. 1. This construction is available in the case of compound steam engines and especially so for internal combustion engines in which it is desirable to obtain a continuous impulse from a succession of explosions.

Where an engine is to be operated by steam, valves 36 may be disposed in the cylinder heads 37, the said valves being connected with each other by cranks 38 and the rod 39 and being adapted to be moved through arcs to alternatively connect the cylinders with the steam inlet and exhaust chambers 40 and 41 arranged adjacent the valves, said chambers being supplied and exhausted by pipes 42 and 43 connected therewith respectively.

As a means of operating the valves and to properly limit the stroke of travel of the piston, the shaft 44 may also be provided. This shaft is journaled in suitable bearings 45 arising from one of the end portions of the base, and it carries at its end small fly-wheels 46 having crank pins on the side of each. These crank pins are connected by the rods 47 with the extensions 8′ of one of the cross-heads so that the shaft may be driven thereby. An eccentric 48 carried by the shaft 44 is connected by a rod 49 with one of the valve cranks 38, it being understood that the valves are operated thereby at suitable intervals. In the case of an internal combustion engine, the fly-wheels 46 will serve to accumulate the energy necessary in compressing the explosive charge and completing the remaining cycles between explosions. For operating such an engine any suitable valve gears can be operated from shaft 44.

It will thus be perceived that I have succeeded in devising means admirably adapted to achieve the various objects and ends in view.

My invention possesses many striking advantages. Thus, from purely structural considerations, it will be obvious that it is notable for the characteristic simplicity arising from the few parts of which it is composed. Furthermore, these parts are none of an involved design, but on the contrary are of such nature as enables them to be made with the greatest facility by the various appliances found in all well equipped machine shops. Consequently the manufacture can be carried out with rapidity and cheapness, and inspection of the working parts can be very easily made and worn parts may be readily replaced and adjusted as to wear.

From the aspect of its use and operation, it will also be perceived that I have devised an efficient fluid pressure motor in which the motion of the pistons will be transformed into a continuous rotation of a drive shaft arranged in substantial parallelism with the piston rods.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Now, having described my invention, what I claim and desire to secure by Letters Patent is:—

1. A fluid pressure engine comprising, in combination, cylinders, synchronously movable pistons, means for controlling a motive fluid, clutches each having a driven member rigidly connected to a common shaft, helically-grooved rods connected with the driving members of said clutches, and means connecting each of the pistons with one of the helically-grooved rods whereby a rectilinear motion of said piston will operate to rotate the shaft.

2. A fluid pressure engine comprising, in combination, a plurality of cylinders, pistons movable in said cylinders and rigidly connected with each other, means for controlling a motive fluid for actuating said pistons, a screw-shaft connected with each of the said pistons and rotated thereby alternately in opposite directions, a driven shaft, and means connecting said driven shaft with the screw shafts so that a rotation of the latter in one direction will be communicated to the driven shaft.

3. A mechanism of the nature disclosed comprising, in combination, a pair of alined cylinders, pistons having piston rods protruding from said cylinders, a cross head fixed to the rods from each piston a guide connecting said cylinders and forming a seat for said cross-head, a screw-shaft rotatively mounted on said guides and in mesh with said cross-head whereby a reciprocation of the latter will produce a rotation of said screw-shaft, a drive shaft arranged substantially parallel with said piston rods, and a mechanical connection between said drive shaft and said screw-shaft.

4. A mechanism of the nature disclosed comprising, in combination, a pair of cylinders, pistons arranged to reciprocate in said cylinders, a pair of cross-heads each mounted in operative relation with one of said pistons, a screw-shaft in operative relation with each of said cross-heads, a shaft, clutch mechanism between said shaft and each screw-shaft and arranged whereby said screw-shafts may alternately act to rotate said shaft in a predetermined direction, and means for causing said screw-shafts to rotate in opposite directions during the reciprocations of said pistons.

5. A mechanism of the nature disclosed comprising, in combination, a driving shaft, a two-part screw-shaft, clutch mechanism for enabling said screw-shaft to rotate said shaft in a predetermined progressive direction, reciprocatory means adapted to rotate one portion of said screw-shaft in a right handed direction and other portion in a left handed direction during the advance of said means and adapted to cause a reverse movement of said part during the retreat of said means, and a fluid pressure mechanism for alternately advancing and retreating said means.

6. A mechanism of the nature disclosed comprising, in combination, a rod having fixed thereto a pair of distanced cross-heads, fluid pressure means for reciprocating said rod and cross-heads, a screw-shaft meshing with each of said cross-heads, said screw-shafts being reversely formed relatively to each other and thereby adapted to be simultaneously oppositely rotated by said cross-heads, a drive shaft, and a clutch mechanism connecting each screw-shaft therewith whereby each screw-shaft will alternately rotate said drive shaft.

7. A mechanism of the nature disclosed comprising, in combination, a frame, a pair of cylinders mounted thereon, a piston adapted to reciprocate within each cylinder and each having a piston rod, said piston rods being substantially parallel, a shaft revolubly mounted in said frame and arranged in substantial parallelism with said piston rods and in relatively close proximity thereto, a fly-wheel carried by said shaft adjacent the rear end of one of said cylinders, and intermediate mechanism between said piston rods and said shaft for transforming the reciprocations of said piston rods into a progressive rotation of said shaft.

8. A mechanism of the nature disclosed comprising, in combination, an elongated frame, a cylinder mounted at each end of said frame, a piston adapted to reciprocate within each cylinder, said pistons being connected by a piston rod, a shaft revolubly mounted in said frame in substantial parallelism with said piston rod and in relatively close proximity thereto, and a pair of clutches between said piston rod and said shaft, the one clutch being adapted to transform an advanced reciprocation of said piston rod into a right-handed rotation of said shaft and the other clutch being adapted to transform a retreating reciprocation into a like rotation of said shaft.

9. A mechanism of the nature disclosed comprising, in combination, a pair of alined cylinders, non-rotatable pistons within said cylinders and having each piston rod of a length greater than the travel of the pistons, valve mechanism for said cylinders operative from said piston rods, a driving shaft arranged substantially parallel to said piston rods, and means connected with said piston rods for transforming the reciprocations of said rods into a progressive rotation of said driving shaft.

10. A mechanism of the nature disclosed comprising, in combination, a pair of alined cylinders, a non-rotatable piston in each cylinder, a piston rod connecting each piston, valve mechanism for said cylinders operative from said piston rods, means for transforming the reciprocations of said piston rods into rotations, and a drive shaft arranged substantially parallel with said piston rods and adapted to be rotated through the instrumentality of said transforming means.

11. A mechanism of the nature disclosed comprising, in combination, a pair of alined cylinders, pistons having piston rods protruding from said cylinders, a frame connecting said cylinders, a screw-shaft rotatively mounted on said frame and in gear with said piston rods, whereby a reciprocation of the latter may produce a corresponding rotation of said screw-shaft, a drive shaft arranged substantially parallel with said piston rods, and a mechanical connection between said drive shaft and said screw-shaft.

12. A mechanism of the nature disclosed comprising, in combination, a pair of cylinders, pistons arranged to reciprocate in said cylinders and connected by a piston rod, a screw-shaft in operative relation with each of said piston rods, a shaft, clutch mechanism between said shaft and each screw-shaft and arranged whereby said screw-shafts may alternately act to rotate said shaft in a predetermined direction, and means for causing said screw-shafts to rotate in opposite directions during the reciprocations of said pistons.

13. A mechanism of the nature disclosed comprising, in combination, a rod, fluid pressure means for reciprocating said rod, a screw-shaft meshing with said rod, said screw-shaft comprising two relatively movable sections reversely formed relatively to each other and adapted to be simultaneously oppositely rotated by said rod, a drive shaft, and a clutch mechanism connecting each portion of said screw-shaft therewith for the purpose of enabling said portions to alternately rotate said drive shaft.

14. A mechanism of the nature disclosed comprising, in combination, a pair of alined cylinders, a piston within each cylinder, a piston rod connecting each piston, a pair of spaced cross heads secured to said piston rod, means intermediate said cross heads and connected therewith for transforming the reciprocations of said piston rods into rotations, and a drive shaft arranged in substantial parallelism with said piston rod and adapted to be rotated by said means.

15. A mechanism of the nature disclosed comprising, in combination, a pair of alined cylinders, pistons having piston rods protruding from said cylinders, a guide connecting said cylinders and forming a seat for cross heads spaced apart on said piston rods, a worm positioned intermediate said cross heads and rotatively mounted on said guide, said worm being in mesh with said cross heads whereby a reciprocation of the latter will produce the rotation of said worm, a drive shaft arranged in substantial parallelism with said piston rods, and a mechanical connection between said drive shaft and said worm.

16. A mechanism of the nature disclosed comprising in combination, a fluid pressure reciprocating means, cross-heads driven by said reciprocating means, oppositely threaded screw-shafts in substantial alinement meshing with said cross-heads, and adapted to be simultaneously, oppositely rotated thereby, a driven shaft having fixed thereon a gear engaging a similar gear on a power shaft, the latter arranged parallel to the line of reciprocation of the cross-heads and a clutch device for transmitting to the driven shaft a continuous rotation in one direction.

In testimony whereof I affix my signature, in the presence of two witnesses.

JOEL W. WEST.

Witnesses:
JOHN F. MORIARTY,
B. J. SCANNELL.